Oct. 20, 1953          J. E. HARVEY          2,655,847
AUTOMATIC FILM WINDING AND SHUTTER TENSIONING
CONTROL CAMERA MECHANISM
Filed April 15, 1948          10 Sheets-Sheet 1
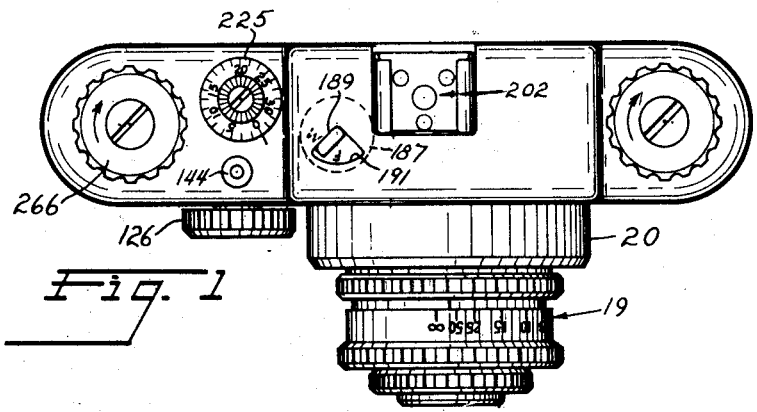
Fig. 1
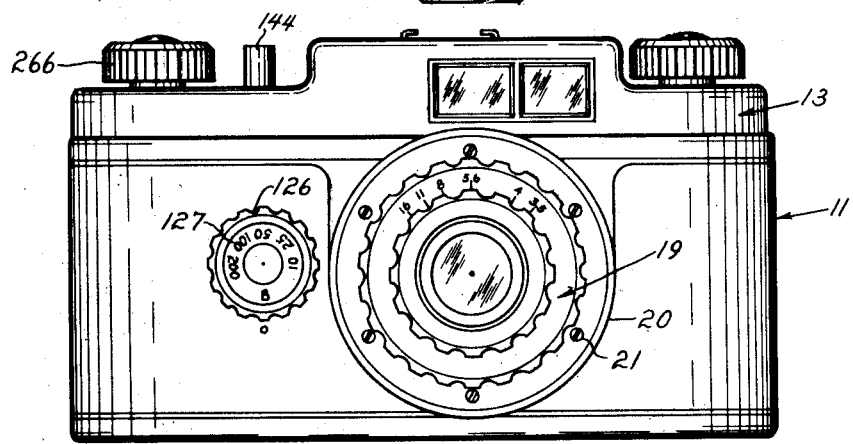
Fig. 2
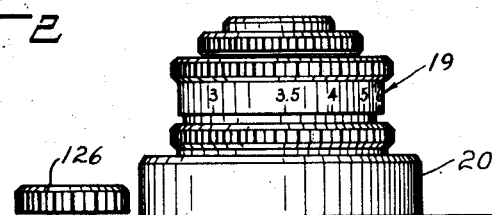
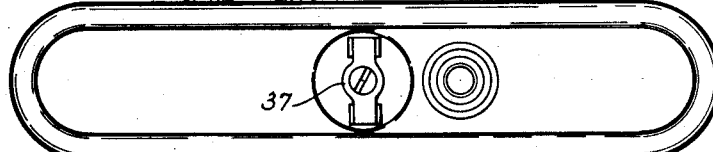
Fig. 3
INVENTOR.
JAMES E. HARVEY
BY
*Strauch & Hoffman*
ATTORNEYS Oct. 20, 1953  J. E. HARVEY  2,655,847
AUTOMATIC FILM WINDING AND SHUTTER TENSIONING
CONTROL CAMERA MECHANISM
Filed April 15, 1948  10 Sheets-Sheet 2

INVENTOR.
JAMES E. HARVEY
BY
Strauch & Hoffman
ATTORNEYS

Oct. 20, 1953  J. E. HARVEY  2,655,847
AUTOMATIC FILM WINDING AND SHUTTER TENSIONING
CONTROL CAMERA MECHANISM
Filed April 15, 1948  10 Sheets-Sheet 4
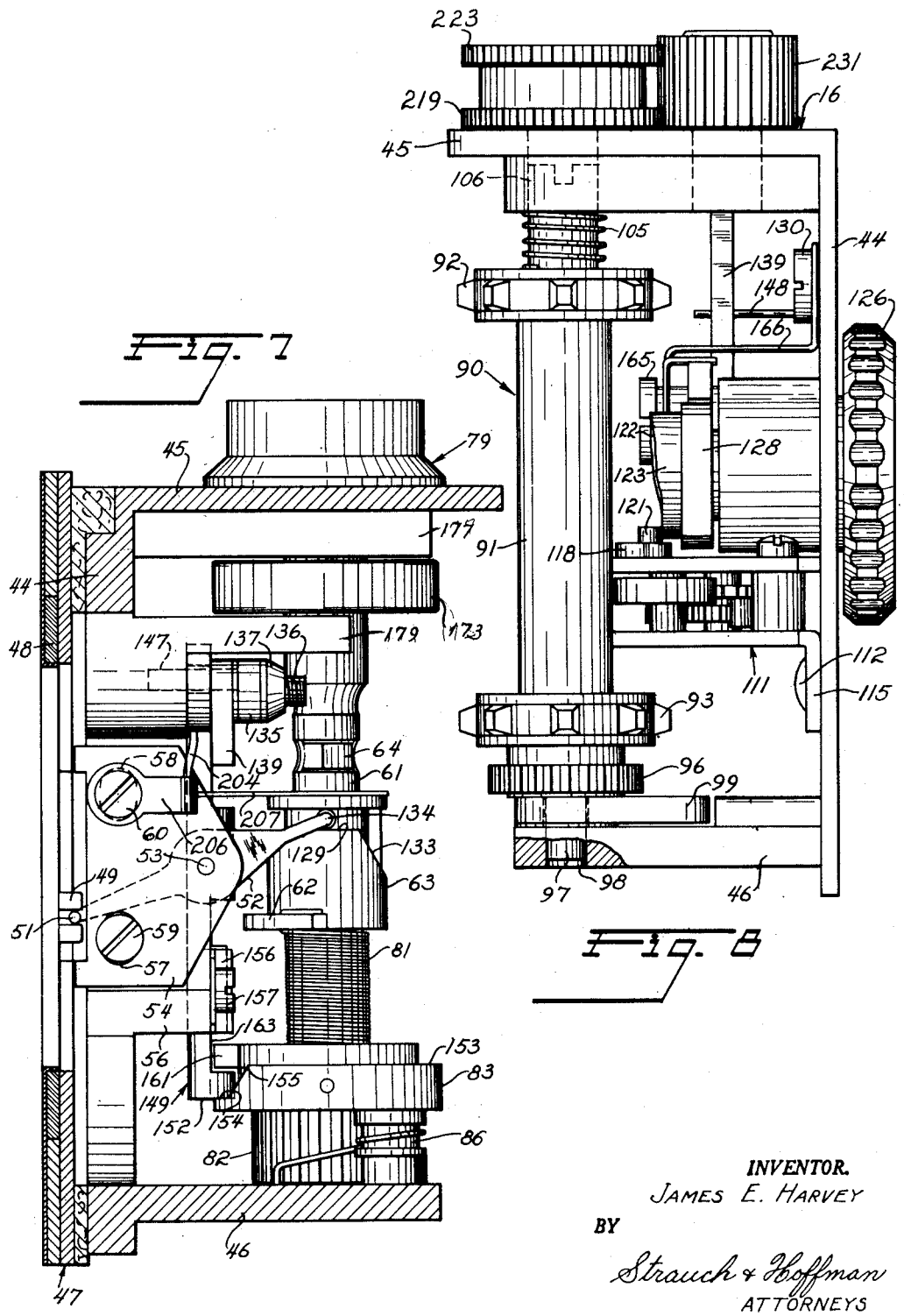
INVENTOR.
JAMES E. HARVEY
BY
Strauch & Hoffman
ATTORNEYS Oct. 20, 1953  J. E. HARVEY  2,655,847
AUTOMATIC FILM WINDING AND SHUTTER TENSIONING
CONTROL CAMERA MECHANISM
Filed April 15, 1948  10 Sheets-Sheet 5

INVENTOR.
JAMES E. HARVEY
BY
Strauch & Hoffman
ATTORNEYS

Oct. 20, 1953  J. E. HARVEY  2,655,847
AUTOMATIC FILM WINDING AND SHUTTER TENSIONING
CONTROL CAMERA MECHANISM
Filed April 15, 1948  10 Sheets-Sheet 6
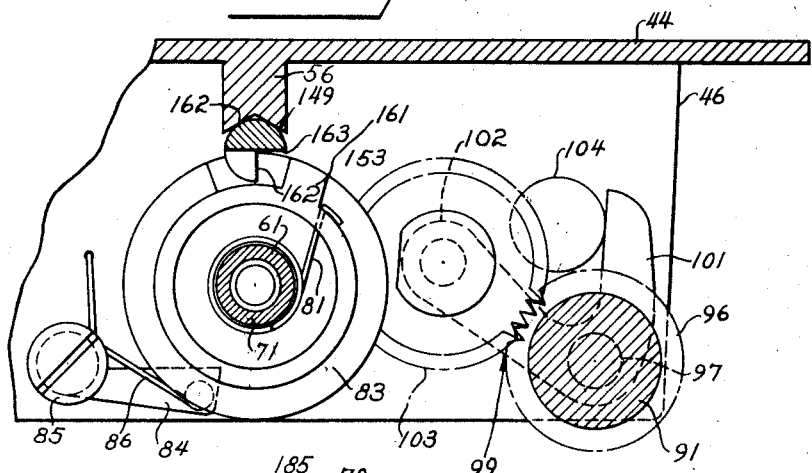
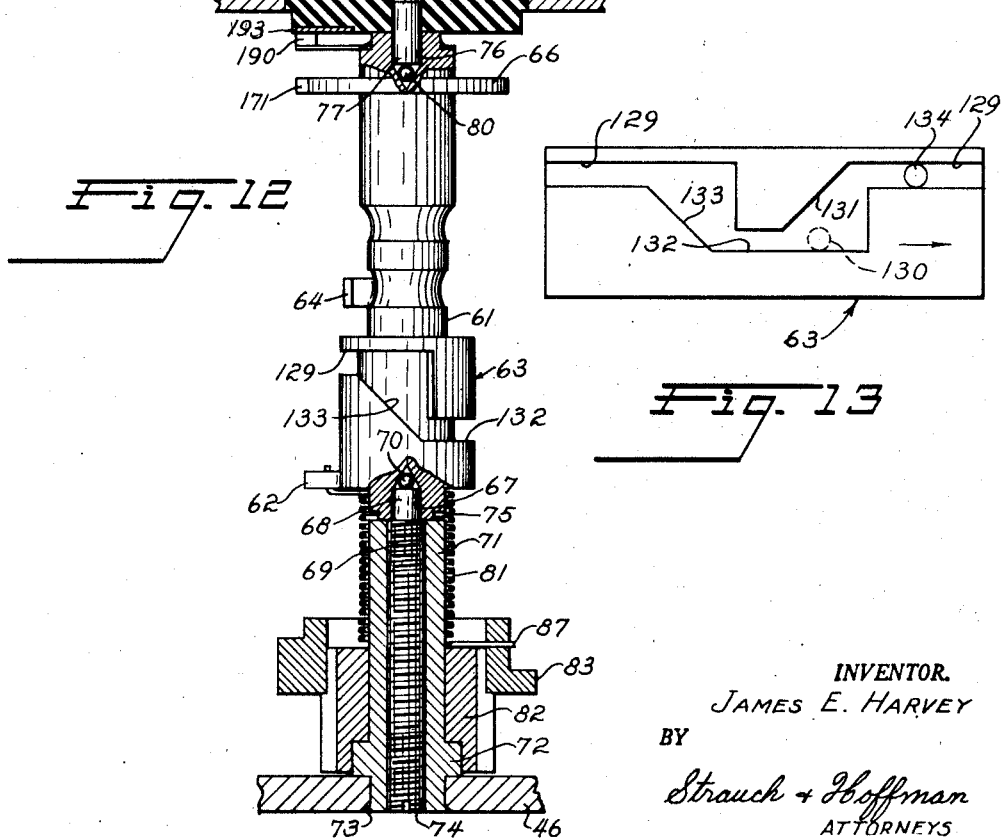
INVENTOR.
JAMES E. HARVEY
BY
Strauch + Hoffman
ATTORNEYS

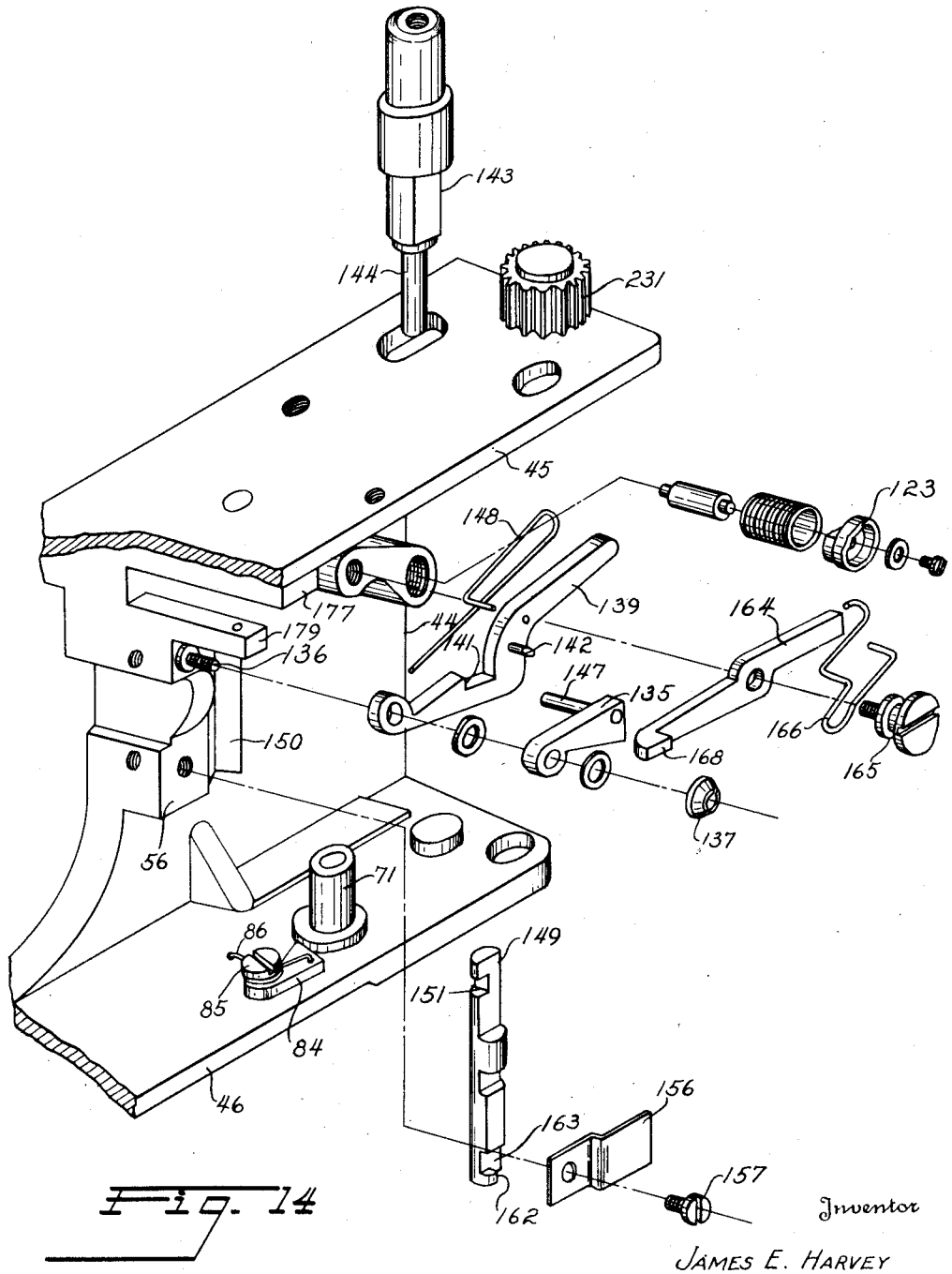

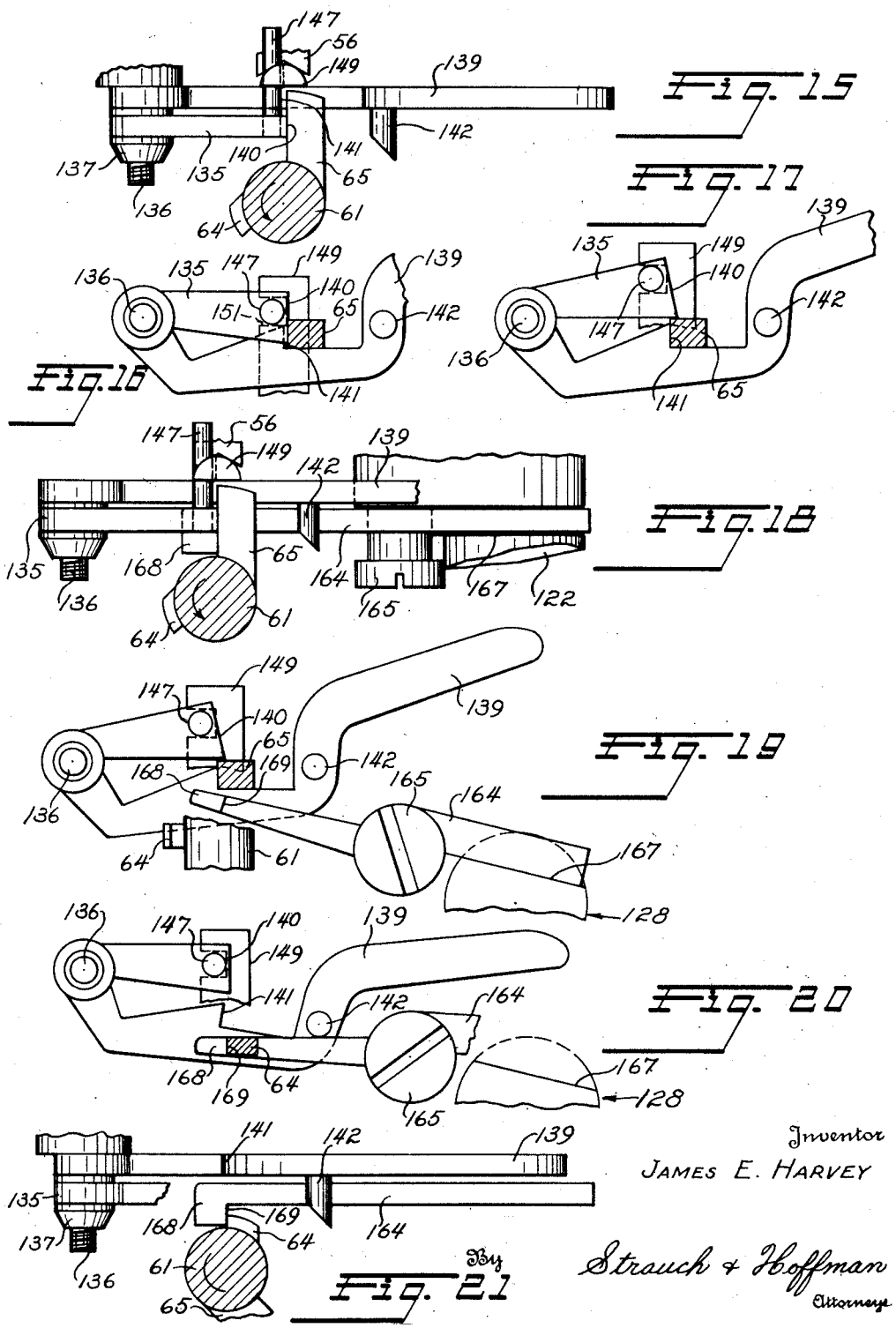

Oct. 20, 1953  J. E. HARVEY  2,655,847
AUTOMATIC FILM WINDING AND SHUTTER TENSIONING
CONTROL CAMERA MECHANISM
Filed April 15, 1948  10 Sheets-Sheet 9
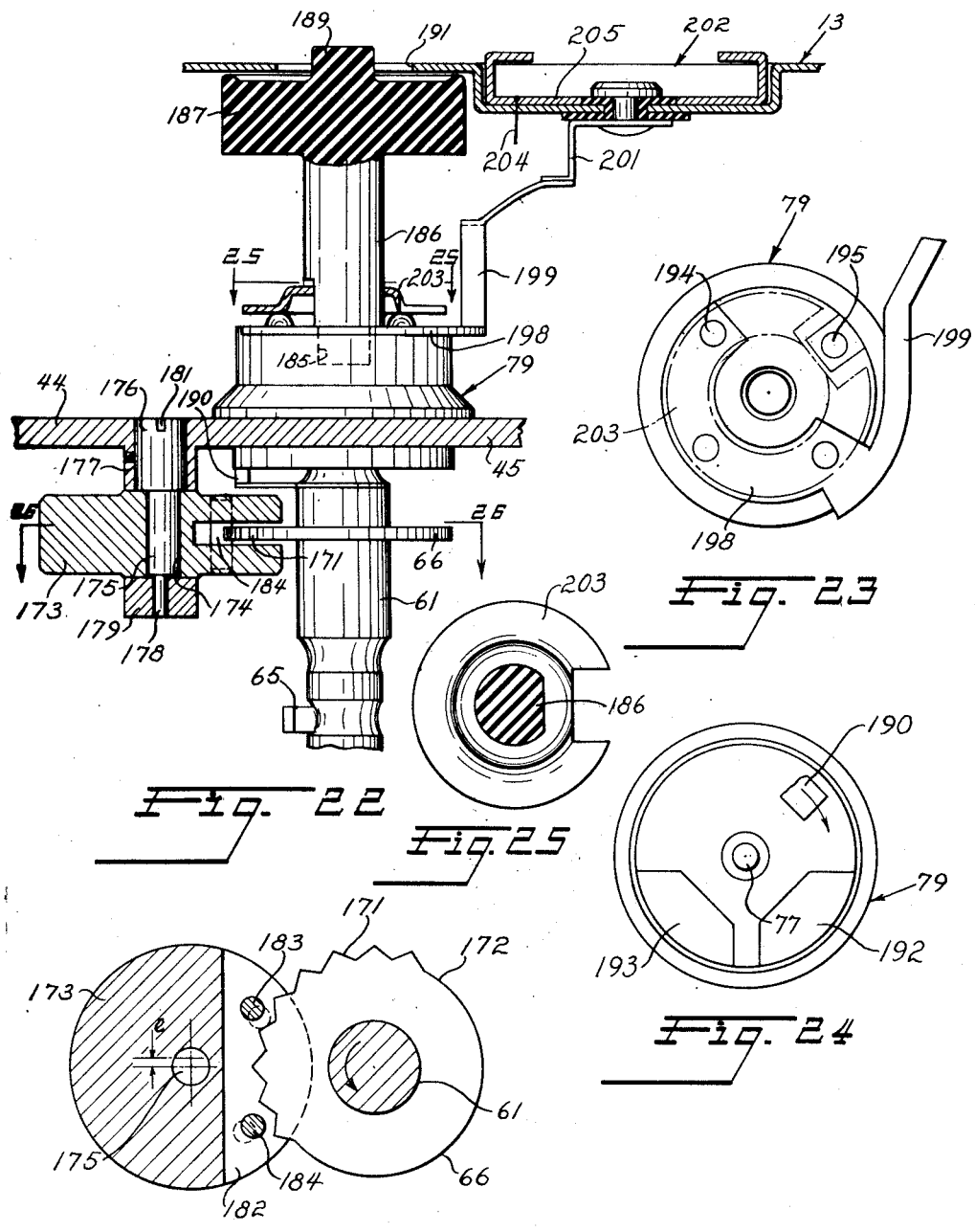
Inventor
JAMES E. HARVEY
By Strauch & Hoffman
Attorneys Oct. 20, 1953  J. E. HARVEY  2,655,847
AUTOMATIC FILM WINDING AND SHUTTER TENSIONING
CONTROL CAMERA MECHANISM
Filed April 15, 1948  10 Sheets-Sheet 10
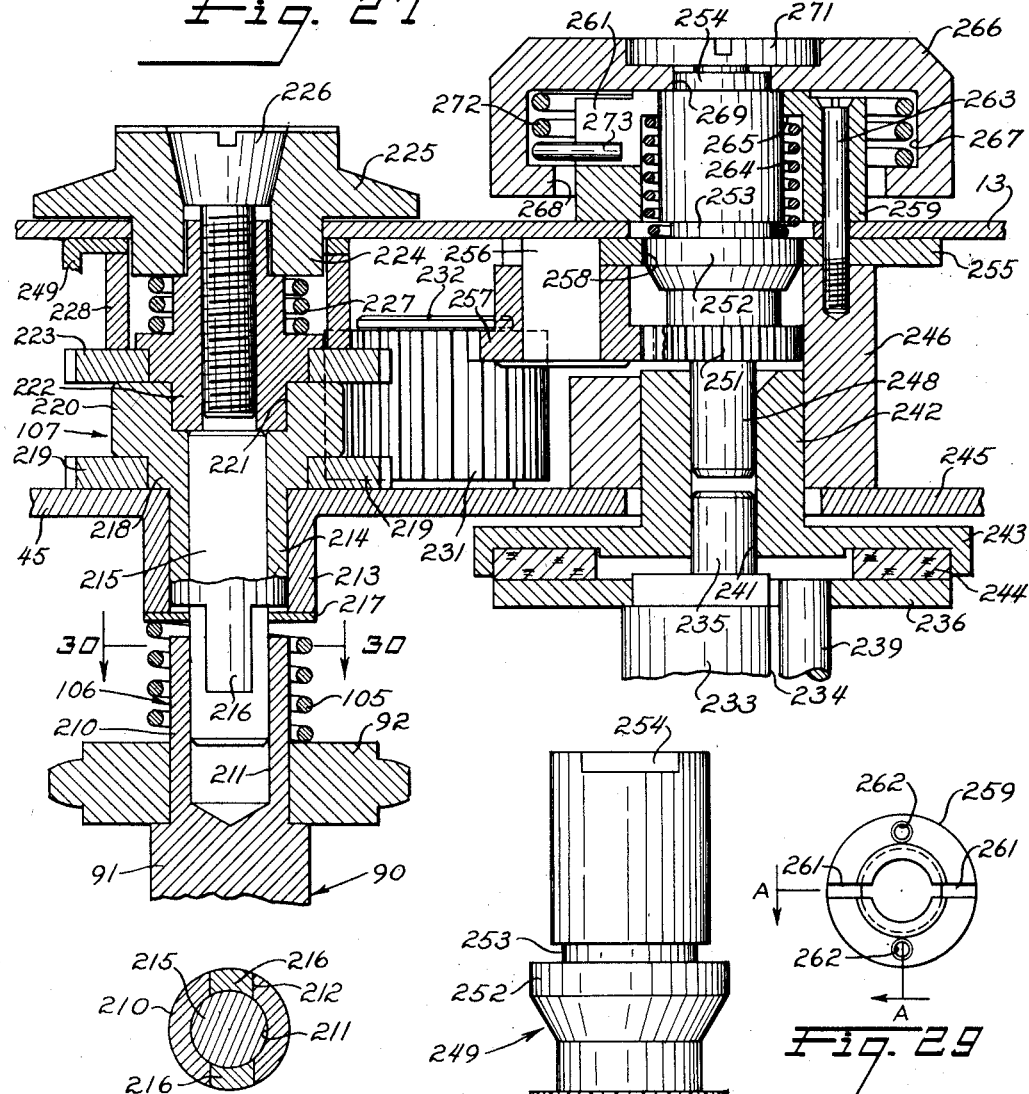
Inventor
JAMES E. HARVEY
By Strauch + Hoffman
Attorneys Patented Oct. 20, 1953

2,655,847

UNITED STATES PATENT OFFICE 2,655,847

AUTOMATIC FILM WINDING AND SHUTTER TENSIONING CONTROL CAMERA MECHANISM

James E. Harvey, Ann Arbor, Mich., assignor to Argus Cameras, Inc., Ann Arbor, Mich., a corporation of Michigan Application April 15, 1948, Serial No. 21,284

24 Claims. (Cl. 95—31)

This invention relates to cameras and particularly to the novel association of shutter and film advancing mechanisms in cameras.

It is the major object of the invention to provide a novel associated film advance and shutter control mechanism wherein double exposures are prevented.

A further object of the invention is to provide a novel camera construction wherein the shutter and substantially all of the associated mechanism for operating and controlling it are all mounted on a common removable part so as to be removable as a unit from the camera for repair or replacement.

A further object of the invention is to provide a novel shutter driving assembly in a camera.

A further object of the invention is to provide in a camera a spring operated power shaft assembly associated with novel arrangements for controlling the cycle and speed of rotation of the shaft.

A further object of the invention is to provide a camera construction wherein a novel spring operated power shaft positively accomplishes opening and closing movement of the shutter.

A further object of the invention resides in the novel association of a power driven shaft with suitable stop and release mechanism in a camera whereby after an exposure has been made no succeeding exposure is possible until the film has been advanced the necessary amount to bring a fresh unexposed area before the exposure aperture.

It is a further object of the invention to provide in a camera having a main power unit driving a shutter, a novel positive cam and lever connection between the power unit and the shutter.

It is a further object of the invention to provide a camera with shutter control mechanism having novel adjustment for bulb or various instantaneous exposures.

It is a further object of the invention to provide a novel shutter control and release and film advance interlock in a camera.

A further object of the invention is to provide a camera having novel internal construction and subassembly arrangements.

A further object of the invention is to provide a novel power shaft assembly in a camera for driving the shutter.

Further objects of the invention will presently appear as the description proceeds in connection with the appended claims and the annexed drawings wherein:

Figure 1 is a top plan view of a camera constructed according to a preferred embodiment of the invention;

Figure 2 is a front elevation of the camera of Figure 1;

Figure 3 is a bottom elevation of the camera of Figure 1;

Figure 6 is an enlarged rear elevation of the removable front plate subassembly comprising the film feed and shutter control mechanism;

Figure 7 is an end elevation of the subassembly of Figure 6 as indicated by line 7—7 in Figure 6;

Figure 11 is a section substantially on line 11—11 of Figure 6;

Figure 12 is a side elevation partly in section of the power shaft assembly;

Figure 13 is a linear development of the shutter operating cam of the power shaft;

Figure 14 is an exploded view of part of the mechanism of Figures 6–13, for clearer illustration of their relative positions in the assembly;

Figure 15 is a fragmentary top elevation illustrating the power shaft and release latch association prior to cocking of the power spring;

Figure 16 is a side elevation of the parts of Figure 15;

Figure 17 is a side elevation illustrating the position of the release latch and power shaft after the power spring has been cocked;

Figure 18 is a top plan view similar to Figure 15, but with the bulb exposure control latch illustrated;

Figure 19 is a side elevation of the parts of Figure 18;

Figure 20 is a side elevation of the parts of Figures 18 and 19 after the release latch has been depressed and illustrating the power shaft rotation stopped by the bulb latch with the shutter open;

Figure 21 is a top plan view of the parts of Figure 20;

Figure 22 is an enlarged elevation partly in section illustrating the upper end of the power shaft and associated controls;

Figure 23 is a top plan view of the synchronizer bearing assembly with the shiftable switch contact shown in phantom lines;

Figure 24 is a bottom plan view of the synchronizer bearing assembly with the brush on the power shaft illustrated diagrammatically;

Figure 25 is a section substantially on line 25—25 in Figure 22 illustrating a top plan view of the contact member on the synchronizer shaft;

Figure 26 is a section substantially along line 26—26 of Figure 22 illustrating the inertia wheel and its adjustable mount;

Figure 27 is an enlarged fragmentary view mainly in section illustrating a further embodiment of the invention wherein the sprocket is driven directly from the film wind mechanism;

Figure 28 is a side elevation of the wind gear unit;

Figure 29 is a top plan view of the clutch block in the film wind assembly;

Figure 30 is a fragmentary section on line 30—30 of Figure 27, and

Figure 31 is a top plan view of the clutch member in the wind assembly.

Figures 4, 5:
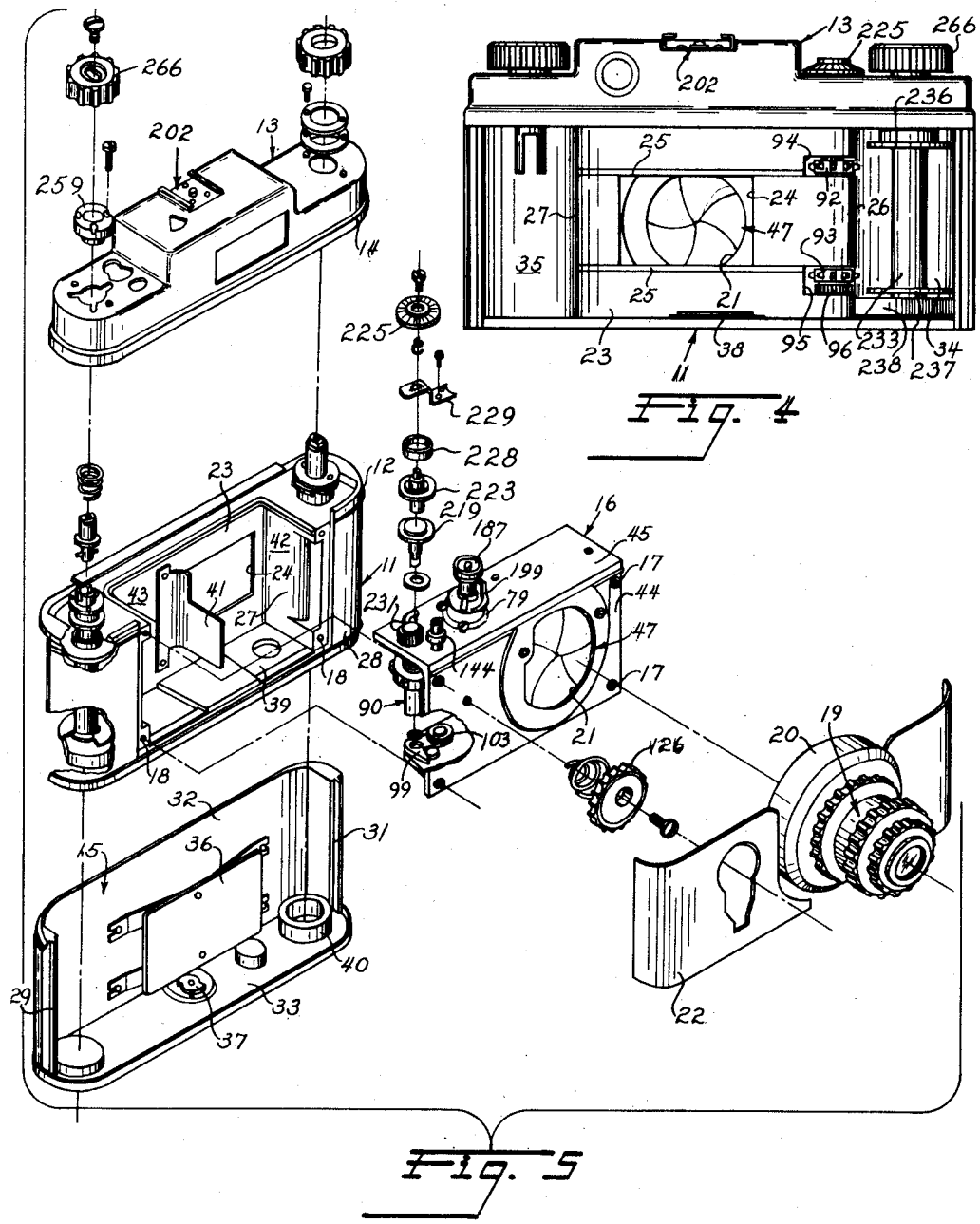
Figure 4 is a rear elevation of the camera of Figure 1 with the back cover removed.
Figure 5 is an exploded view of the camera parts illustrating the top, the body and back cover in vertical separation with the removable front plate assembly on which the film and shutter control mechanism is mounted displaced from the body.

Referring chiefly to Figures 1–6 the camera comprises a case body 11 formed around its upper periphery with a shallow ledge 12 upon which is fitted the top part 13 of the camera. Top 13 is essentially a stamped shell of light metal suitably formed as will hereinafter be described and provided with a rim 14 adapted to seat around ledge 12. A rear cover assembly 15 which is quickly separable from the body for insertion and removal of the film is illustrated below body 11 in Figure 5. To the right of the body 11 in Figure 5 is illustrated a front plate subassembly 16 which in the completed camera is secured to body 11 as by screws extending through suitable corner holes 17 in the front plate and threaded apertures 18 in the camera.

A removable lens assembly 19 is threadedly mounted in a suitable cap 20 secured as by screws 21 over the shutter aperture of the front plate assembly, and a flexible fabric or leather covering material 22 is secured along the whole front side of the camera on opposite sides of the lens assembly to conceal the screws and other joints between front plate assembly 16 and body 11 and provide a finished appearance to the camera. The lens assembly is preferably that disclosed and claimed in my copending application Serial No. 775,786, filed September 24, 1947, now Patent No. 2,532,300, issued December 5, 1950.

Camera body 11 comprises a rear body wall 23 formed with a rectangular exposure aperture 24. Parallel film guide rails 25 extend along the sides of aperture 24, as illustrated in Figure 4, slightly above the surface level of wall 23. Rear body wall 23 is joined by rounded corners to transverse walls 26 and 27 that extend forwardly to a front body wall 28. At opposite ends front body wall 28 curves rearwardly to provide half side walls formed for light tight juncture with the complementary half side walls 29 and 31 that are integral with rear wall 32 and bottom wall 33 of back cover 15. This body construction provides rounded transverse film spool chambers, indicated at 34 and 35 in Figure 4, which are open to the rear of the body and enclosed by back cover 15. The film, in passing over aperture 24, is resiliently pressed against rails 25 by spring biased presser plate assembly 36 on the cover. The bottom wall 33 of back cover 15 is provided with a latch 37 for engaging a coacting device 38 on the bottom body wall 39 and a cup 40 for receiving one end of the film supply spool.

The above described body and back cover construction is preferably substantially the same as that disclosed in United States Patent No. 2,378,406 issued June 19, 1945, to Clinton H. Harris, to which reference is made for more detailed disclosure. Departures from that patented construction will be described in detail below.

Within the forwardly open space defined in the body by walls 23, 26, 27 and 29 is a forwardly extending light shield plate 41 riveted to wall 23. Shield 41 effectively partitions that space into a light passage chamber 42 before aperture 24 and a power shaft and sprocket mechanism chamber 43 to the left of shield 41 in Figure 5, as will appear, and protects the mechanism.

The front plate subassembly, as illustrated in Figures 5 and 7, comprises a plate 44 that is flush with and serves as the central substantially continuous part of front body wall 28 in the camera assembly, an integral rearwardly projecting flange 45 which serves part of the top body wall between the spool chambers and a parallel rearwardly extending bottom flange 46. A suitable shutter subassembly 47 of known construction is externally secured to suitably apertured plate 44. Because of its threaded end mounting in cap 20, the lens assembly 19 may be bodily removed for use in an enlarger or the like while the normally closed shutter 47 maintains the aperture light tight and protects any film that may be in the camera against exposure.

A rotatable shutter operating ring 48 (Figure 7) is journalled in the shutter assembly and has rearwardly extending therefrom a bifurcated projection 49 adapted to receive an operating pin 51 comprising the integral turned end of a shutter operating toggle lever 52 pivoted upon an arbor 53 extending between two fixedly spaced plates 54 and 55 riveted together to provide a unitary shutter operating lever mount. Lever 52 is of hardened steel to reduce wear.

Figure 10:
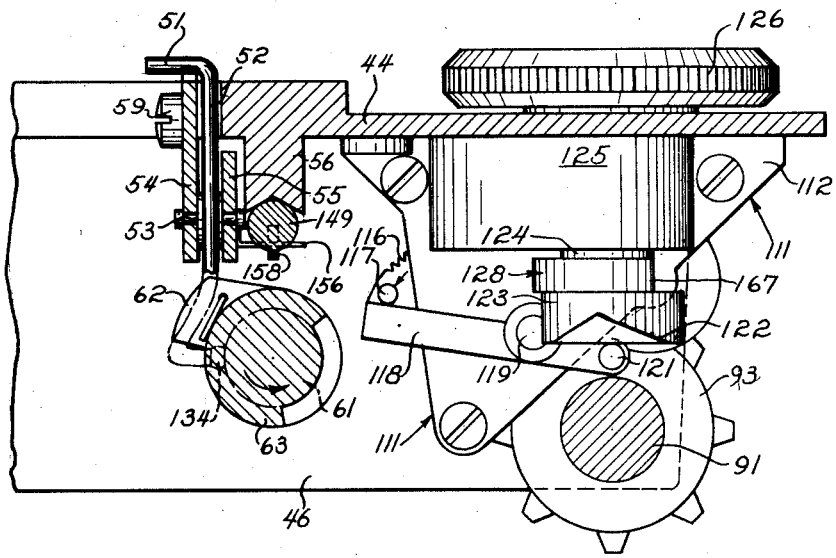
Figure 10 is a section substantially on line 10—10 of Figure 6.

As illustrated in Figures 7 and 10, wall 44 is formed with a thickened portion upon which the entire shutter operating lever mount is mounted supported for adjustment in a direction perpendicular to the axis of arbor 53 which in turn is perpendicular to the optical axis of the lens assembly. As illustrated in Figure 7, plates 54 and 55 are each formed with vertically aligned and elongated apertures 57 and 58 through which extend screws 59 and 60 threaded into the thickened wall portion. When both screws are loosened, it will be apparent that the shutter operating lever mount assembly consisting of plates 54 and 55 and lever 52 may be adjusted as a unit vertically with respect to shutter operating ring and the adjustment locked by tightening the screws. The purpose of this adjustment will be explained later.

Rocking movement of lever 52 positively rotates shutter ring 48 to open and close the exposure aperture by movement of the usual shutter blades (not shown) pivoted to ring 48 in a conventional manner. Preferably the axis of arbor 53 is substantially in the horizontal plane containing the optical axis of the lens assembly mounted before the shutter, a position attained by the above adjustment as will appear.

The shutter is actuated and controlled by a power shaft 61 which is spring driven and so associated with the film advancing mechanism that it cannot operate to trip the shutter except in predetermined relation with the film feed. Details of this interlock will be explained later.

The power shaft 61 is preferably a machined integral member having thereon an integral radially projecting escapement striking nose 62, a grooved shutter operating cam 63, a radial projection 64 above the cam adapted to coact with the bulb exposure control mechanism as will appear, another radial projection 65 adapted to coact with the shutter release latch as will appear, and an annular projection 66 for coacting with an inertia wheel in controlling the speed of operation of shaft 61 as will also appear.

The lower end of shaft 61 (Figure 12) is formed with a central bearing recess 67 piloted upon a radial bearing pin 68 which comprises the tip end of a bearing screw 69 threaded within the upper end of a lower bearing support sleeve 71. A thrust bearing comprising a ball 70 in a suitable socket is provided at the inner end of recess 67 in contact with the end of pin 68. The lower end of sleeve 71 projects into a suitable aperture in flange 46 and is held securely therein as by an enlarged integral formation 72 engaging the upper surface of flange 46 with lower end of sleeve 71 staked over at 73 at the under side of flange 46 in order to rigidly secure bearing support 71 in upright relation on flange 46. Any other equivalent manner of rigidly securing sleeve 71 to flange 46 may be used. A bearing locking screw 74 is threaded within the lower end of sleeve 71, so that by removing screw 74 access may be had for vertical adjustment of the bearing pivot pin 68.

The annular upper surface of support sleeve 71, indicated at 75, may provide a thrust bearing in the assembly when the lower end of shaft 61 is in contact with the support. The upper end of shaft 61 is similarly formed with a central bearing recess 76 for seating a radial bearing pivot pin 77 comprising a lower end of a bearing adjustment screw 78 threaded within a bushing assembly 79 fixed in a suitable aperture in flange 45. A thrust bearing comprising a ball 80 in a suitable socket is provided in the inner end of recess 76 in contact with the end of pin 77. As will be later described, bushing 79 contains part of the switching mechanism for the photoflash bulb circuit. Bushing 79 may be removed as a unit from flange 45, or access may be had at its top to adjust the vertical position of pivot pin 77 and for adjusting or removing bearing pin screw 78.

The length of shaft 61 need not be unduly accurately machined in manufacture because the above described longitudinal adjustment may be used to locate it. After shaft 61 has been properly longitudinally positioned in the camera for proper coaction with the various latches controlling it by adjustment of pivot pins 68 and 77, the shutter operating lever mount 53, 54 is adjusted parallel to shaft 61 to locate it for optimum actuation of the shutter by cam 63.

Shaft 61 is thus supported for free rotation about a normally vertical axis perpendicular to the optical axis of the camera when the camera is in the position of Figure 2. Rotation of shaft 61 is effected under control of a relatively heavy coiled wire power spring 81 which surrounds both the lower end of shaft 61 below projection 62 and the upper end of bearing support sleeve 71 as illustrated in Figure 12.

Referring to Figure 12, cylindrical support sleeve 71 provides an upright journal for mounting a gear 82 for rotation about the axis of shaft 61. The bore of gear 82 is recessed at its bottom to seat upon the shouldered upper surface of formation 72 and thereby support gear 82 for rotation out of engagement with the upper surface of wall flange 46.

Rigidly secured upon the upper end of gear 82 is a special cam 83 which controls an interlock between the film feed and the shutter operating mechanism, as will be described. Cam 83 is rigid with and rotatable with gear 82 and this rotation is confined to one direction by means of pawl 84 (Figure 11) pivoted upon a stationary axis 85 on flange 46 and urged by spring 86 into contact with the lower ends of the teeth of gear 82, as illustrated best in Figure 6. As viewed in Figure 11, pawl 84 permits rotation of gear 82 in a counterclockwise direction only.

The purpose of gear 82 is primarily to provide a connection between the film advancing mechanism and spring 81 for winding the spring when the film advancing mechanism is being operated to position a fresh unexposed section of film before aperture 24. The lower end of coil spring 81 is anchored at 87 to the gear and cam assembly 82, 83 which is otherwise freely rotatable in the proper direction about the axis of shaft 61, and the upper end of coil spring 81 is anchored to shaft 61 as by attachment to projection 62. As will appear, mechanism is provided for holding shaft 61 against rotation about its axis while gear 82 is being rotated counterclockwise during the film advancing operation and thus winding spring 81.

In a desirable form of the invention, I accomplish rotation of gear 82 by a motion transmitting connection between it and the film driven sprocket 90 which also serves to drive the film counter. Sprocket 90 comprises a shaft 91 having at opposite ends toothed sprocket wheels 92 and 93 adapted to project through suitable slots 94 and 95 in the camera body into engagement with sprocket holes in the film between aperture 24 and the takeup spool chamber 34.

At its lower end, shaft 91 is formed with a spur gear 96 which rotates with it, and below that gear shaft 91 is formed with a reduced cylindrical extension 97 (Figure 8) projecting within a bearing recess 98 in lower flange 46 of the sub-assembly. Between flange 46 and gear 96, a flat plate 99 (Figures 6 and 11) is freely journalled about the sprocket shaft axis and formed with diverging arms 101 and 102. Freely rotatably mounted on arm 102 on an axis parallel to sprocket 90 is a spur gear 103 constantly meshed with gear 96 on the sprocket shaft. Gear 103, besides being rotatable about its axis, is also swingable about the axis of sprocket shaft 91 by reason of the journalling of plate 99 at bearing 97.

Referring to Figure 11, a fixed stop pin 104 projecting upwardly from flange 46 is disposed between arms 101 and 102 to thereby limit rocking of plate 99 about its axis within small angles. When shaft 91 is rotated counterclockwise (Figure 11), as when the film is being wound on the take-up spool, engagement of gears 96 and 103 tends to swing plate 99 counterclockwise so that gear 103 is urged into mesh with gear 82, thereby rotating gear 82 to wind power spring 81. Pawl 84 prevents reverse rotation of gear 82. Engagement of arm 101 with stop pin 104 limits the angular displacement of plate 99 and prevents binding of gears 103 and 83. When sprocket shaft 91 is rotated in the opposite direction, as when the film is being rewound on the supply spool, plate 99 swings clockwise to demesh gears 82 and 103, the swing of plate 99 being checked by pin 104.

Thus, in this illustrated form of my invention, rotation of the film sprocket when the film is being wound on the supply spool, which is rotation of sprocket shaft 91 in a counterclockwise direction in Figure 11, is thereby transmitted through gears 96, 103 and 82 to wind and energize the power spring 81, the film itself being a motion transmitting member in this mechanism. If desired, however, I may provide suitable direct gearing between the film winding spool and the sprocket to eliminate the film as a motion transmitting member, as in Figures 27–31.

Figure 8:
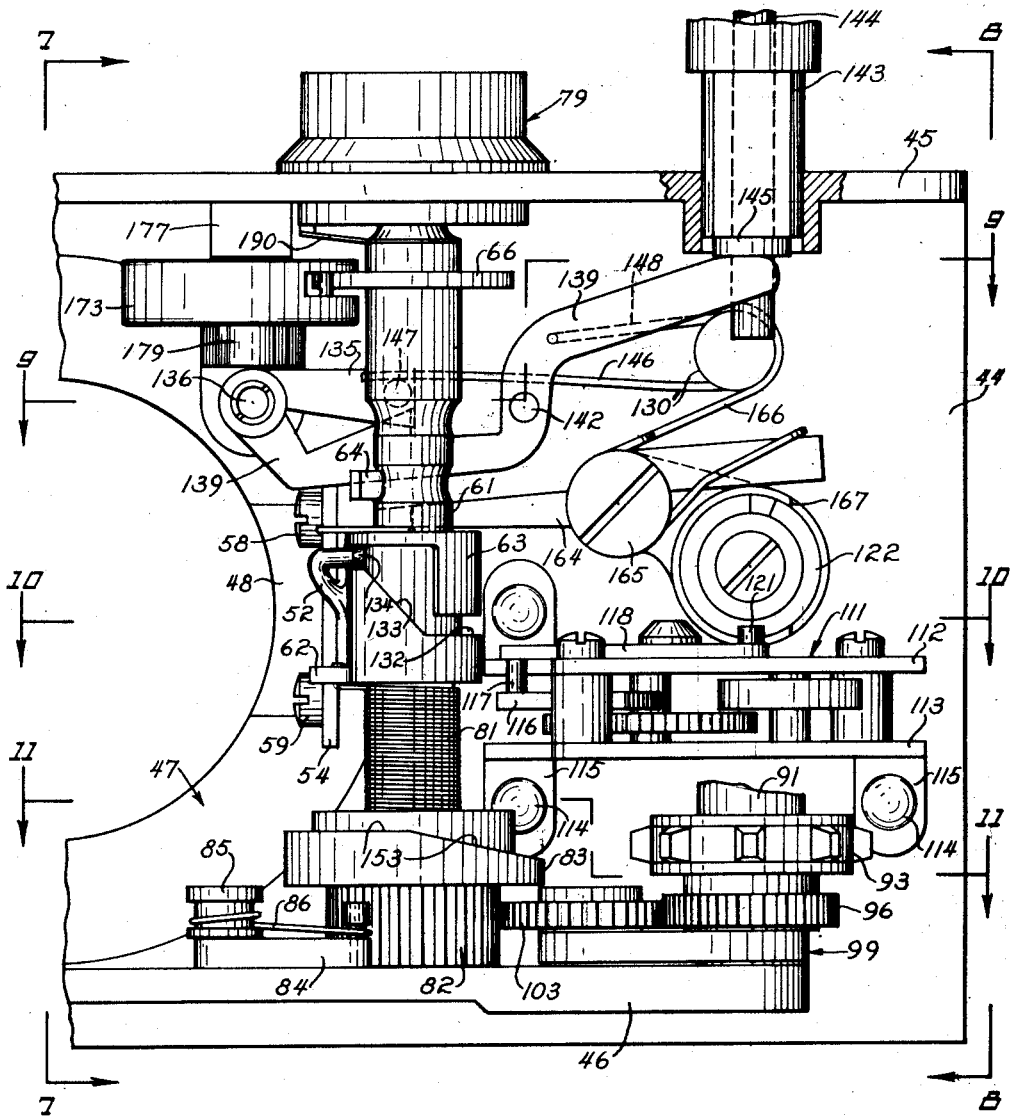
Figure 8 is an end elevation of the subassembly of Figure 6 viewed oppositely from Figure 7 as indicated by line 8—8 in Figure 6.

Referring to Figure 8, the whole sprocket assembly 99 is axially urged downwardly by a compression spring 105 surrounding the upper part of shaft 91 and the lower surface of flange 45. The upper end of shaft 91 has a tongue and groove connection 106 with a film counter driving gear assembly 107 freely journalled in upper flange 45.

The power spring 81, when released, operates to rotate power shaft 61 counterclockwise (Figure 10) to move shutter lever 52 positively during both opening and closing movements of the shutter, this shutter movement being determined by suitable cam surfaces on cam 63. As will be described below, suitable latch mechanism is provided for holding shaft 61 against rotation while the film is being wound and gear 82 rotated, so that spring 81 may thus be energized, and for releasing this latch at the will of the operator when an exposure is desired and a shutter release lever depressed.

The time of rotation of power driven shaft 61 when released to make an exposure is controlled by an escapement assembly 111 (Figure 6) comprising a pair of spaced parallel frames 112 and 113 with suitable gear and pallet mechanism between them and mounted securely upon wall 45 as by rivets 114 pressed through ears 115. Referring to Figure 10, the usual rotatable escapement sector gear 116 carries an upstanding pin 117 normally urged in a counterclockwise direction by a suitable internal spring (not shown) into contact with a bar 118 pivoted at 119 to the top of plate 112. Bar 118 carries at its rear end an upstanding pin 121 in contact with the cam face 122 of a shutter speed adjustment cam 123 fixed upon a shaft 124 that is rotatably supported in a boss 125 integral with front plate 44 and extends through plate 44. A knurled setting dial 126 bearing a series of indicia 127 (Figure 2) calibrated to indicate shutter speeds is fixed to shaft 124 where the shaft projects through the front of the camera. A cam 128 which, as will be explained, controls the shaft release mechanism during bulb operation is also fixed to shaft 124 adjacent face cam 123.

Cam 63 for positively operating shutter lever 52 is preferably an integral cylindrical formation on shaft 61 provided with a continuous peripheral cam recess comprising (Figure 13) a narrow horizontal groove 129, an inclined face 131, a short narrow horizontal groove 132 which represents the dwell period wherein the shutter is stopped wide open when the shutter is operated for a bulb exposure, and oppositely inclined face 133 which communicates with the other end of groove 129.

With the parts at rest and before and during winding of the power spring 81, the cam engaging end of lever 52, which comprises an extension bent oppositely to pin 51 and provided with a ball head 134, is disposed in groove 129 with a running clearance fit adjacent the top of inclined face 133 as illustrated in Figure 7. When shaft 61 is rotated counterclockwise by power spring 81 to make an exposure, cam 63 rotates with it to move as indicated by the arrow in Figure 13 and opening movement of the shutter starts when ball head 134 leaves groove 129 and is positively forced downwardly by inclined cam face 131. During shutter opening movement, head 134 is displaced the depth of cam face 131, with shutter lever 52 being rocked clockwise from its position of Figure 7.

I have observed this action with the aid of high speed photography both at the lower and higher shutter speeds of the camera. At lower shutter speeds of about $\frac{1}{5}$ second, the effect of impact of the leading end of cam face 131 with head 134 is to rock lever 52 much faster than the cam 63 is rotating whereby head 134 actually becomes very quickly displaced to approximately the dotted line position 130 of Figure 13. The action is somewhat as if head 134 were a ball struck by a bat corresponding to face 131, and the low inertia of the shutter lever 52 and shutter parts does not hinder the action appreciably. This means that the shutter opens fully much faster than it would if head 134 merely followed along face 131. The cam 63, as illustrated in Figure 13, is cut away opposite face 131 to the depth level of groove 129 representing maximum shutter opening.

Should the head 134 rebound from the dotted line position of Figure 13 toward face 131, any such rebound is opposed and head 134 returned by striking the advancing face 131. In observed operation, I have discovered that the governing action of the inertia wheel 173, later described in detail, contributes a novel and unexpectedly advantageous control over such rebound during the period it is effective on shaft 61. I have found that this governing action of inertia wheel 173, which takes place during most of the shutter opening movement of cam 63, prevents any substantial rebound of head 134 so that as a practical matter head 134 substantially maintains its indicated displaced position until cam 63 has rotated to bring head 134 within groove 132.

At higher shutter speeds of about $\frac{1}{100}$ second, the same action is noted but there is even less tendency to rebound due to the faster speed of rotation of cam 63. When head 134 reaches the dwell groove 132, the shutter is wide open. Then, when an instantaneous exposure is being made, head 134 passes through dwell 132 quickly and is positively forced upwardly by inclined face 133 to reverse the rocking of lever 52 and accomplish closing movement of the shutter. This reverse rocking of lever 52 is quickly accomplished similarly to the operation described above for the opening movement of the shutter. When lever 52 has been returned to the position of Figure 7, the shutter is closed again and head 134 is once more disposed in groove 129 ready for a repeat operation. The above described operation provides an extremely efficient shutter which is positively controlled and provides unusually accurate exposure determination. Suitable controls, to be described below, limit rotation of shaft 61 to a single complete revolution each time the shutter release plunger is depressed by the operator.

It will be observed that during the entire 360° of rotation of cam 63, shutter lever 52 is positively controlled by the successive cam faces, and that no spring operation other than that powering shaft 61 is relied upon or necessary to actuate the shutter to open or closed position.

Figure 9:
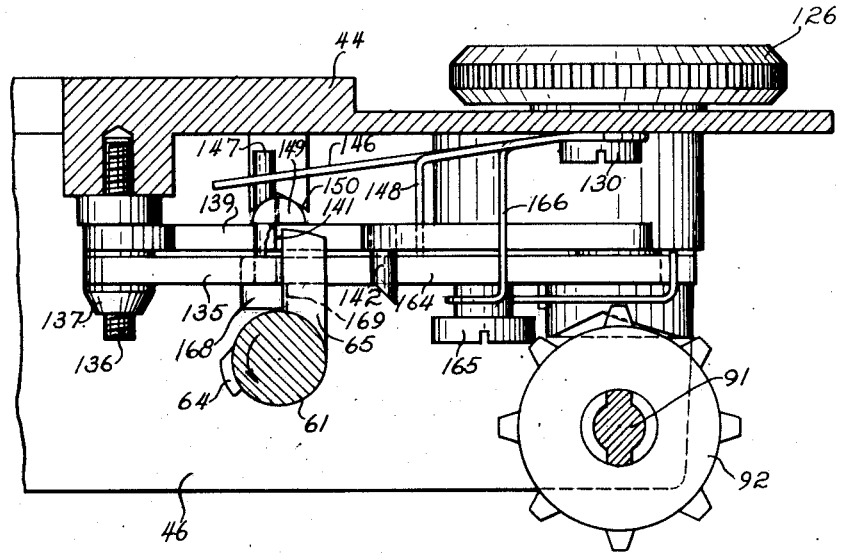
Figure 9 is a section substantially on line 9—9 of Figure 6.

When gear 82 is rotated counterclockwise, winding of power spring 81 takes place because shaft 61, to which the upper end of the spring is anchored, is held against counterclockwise rotation, as illustrated in Figures 9, 15 and 16, by engagement of radial projection 65 with the end face 140 of a stop arm 135 pivoted upon the cylindrical shank of an internally projecting pin 136 having a threaded end and a retainer nut 137.

A shutter release latch 139 is also pivoted on pin 136 (Figures 6, 9, 15 and 16). Latch 139 is formed with a stop face 141 where it extends past shaft 61, and a pin 142 projects inwardly from latch 139 beyond the shaft. The free end of latch 139 is turned upwardly to provide a tip end underlying a shutter release plunger assembly which is slidably mounted in a suitable boss in flange 45 as illustrated in Figure 6 so that, when the plunger is depressed by the operator, latch 139 is rocked downwardly or clockwise about its pivot 136. Plunger 143 surrounds a pin 144 having a collar 145 between latch 139 and the lower end of plunger 143. Pin 144 is adapted for cable release operation. A spring arm 146 bears against the upper side of pin 147 projecting from arm 135 away from shaft 61 for normally urging arm 135 to rotate clockwise, or downwardly.

Spring arm 146 is an extension of one end of a length of spring wire coiled about a fixed projection 130' on the inner side of wall 44 and having another arm 148 secured at its end in an aperture in latch 139 so as to normally urge latch 139 upwardly or counterclockwise. As will appear, spring 148 returns latch 139 to the same initial position after completion of each exposure, instantaneous or bulb.

Removal of stop arm 135 from the path of projection 65 when it is desired to make an exposure is automatically accomplished while spring 81 is being tensioned, provision being made for preventing premature release and operative rotation of shaft 61 at this time by transferring the stop action of face 140 of arm 135 to stop face 141 of latch 139 which, as shown best in Figure 15, lies only slightly behind face 140 of arm 135.

A reset bar 149 is slidably mounted parallel to shaft 61 in a suitable V-guide 150 in the inner surface of wall projection 53 (Figures 7 and 15). The upper end of bar 149 is recessed at 151 to receive the projecting end of pin 147, so that upward displacement of bar 149 rocks stop arm 135 counterclockwise out of the path of projection 65 to the position illustrated in Figure 17.

Upward displacement of bar 149 is effected by engagement of the bottom surface 152 of bar 149 with the inclined ramp 153 (Figure 6) of lift cam 83. With the parts in the position of Figure 7, prior to winding up spring 81, bar end 152 rests upon the low face 154 at one end of ramp 153. As gear 82 and cam 83 are rotated by advance of the film as above described, inclined part of ramp 153 gradually raises bar 149. The slope of ramp 153 is such that a single revolution will raise bar 149 sufficiently to rock stop arm 135 upwardly to the position of Figure 17 where face 140 is out of the path of projection 65.

As arm 135 leaves the path of projection 65, shaft 61 rotates a very small angle but any material rotation is stopped by contact of projection 65 with stop face 141 on latch 139, as also illustrated in Figure 17. This transfer is effected without noticeable effect upon the winding of spring 81. Ramp 153 is sufficiently long to keep bar 149 raised until after this transfer takes place. Then, after the high level surface of ramp 153 has passed the bottom of bar 149, near the end of a revolution of cam 83, spring 146 tends to displace bar 149 downwardly, but such is prevented by the fact that stop arm 135 now abuts the top of projection 65 as also illustrated in Figure 17.

The high level surface of ramp 153 is attained by bar surface 152 before cam 83 has turned a complete revolution, and this surface is joined to low face 154 by a steep incline 155 illustrated in Figure 7. As the high surface of the ramp passes from beneath surface 152, bar 149 is maintained in its raised position by the above described contact of stop 135 with projection 65 and also to some extent by the friction exerted by a spring guide plate 156 secured at one end to wall 44 as by screw 157 and extending over a flat side area of bar 149 opposite guide 150 to thereby prevent rotation of bar 149 about its axis.

After cam 83 has been rotated through a single revolution, a radial projection 161 on the cam, spaced a small distance above low face 154 as illustrated in Figure 7, comes into contact with the lower end portion 162 of the raised reset bar, which thereby serves as a stop to prevent further winding of spring 81 and to stop advance of the film through the camera. The parts are so dimensioned that a single revolution of sprocket 90 which represents one frame advance of the film causes a single revolution of cam 83, gears 96 and 83 being of the same size. Thus the film is always advanced the same measured linear distance regardless of the amount of film on the take-up spool.

Hence, as soon as cam 83 has been rotated a single revolution, the power spring 81 is cocked, and rotation of shaft 61 (counterclockwise in Figure 9) is prevented only by engagement of projection 65 with stop face 141 on latch 139. At the will of the operator, plunger 143 or pin 144 may now be depressed to rock latch 139 downwardly and remove stop face 141 from the path of projection 65. This movement also loads spring 146 to urge stop 135 clockwise in Figure 6. When this is done, shaft 61 immediately rotates under the power of spring 81, counterclockwise in Figures 9, 10 and 11.

As soon as projection 65 has rotated from beneath stop arm 135, the latter is rocked downwardly by spring 146 to assume its previous position in the path of projection 65, and this also displaces reset bar 149 downwardly to its initial position where its lower end 162 is out of the path of cam projection 161. This restoration of stop arm 135 to initial position thus limits rotation of shaft 61 to a single revolution and the automatic unlatching of cam 83 frees that cam to make another revolution in the subsequent film winding operation. The pawl 84 prevents any rotation of the cam 83 during power driven rotation of shaft 61. Stop bar 149 is notched at 163 above portion 162 to permit cam projection 161 to pass bar 149 during rotation of cam 83 in the subsequent spring cocking operation.

During the single rotation of shaft 61, cam 63 positively opens and closes the camera shutter as above explained. The speed of rotation of shaft 61, and hence the shutter speed, is controlled by projection 62 engaging escapement 111 and this speed may be varied by rotation of face cam 122. Sector wheel 116 of the escapement, which internally is of conventional structure and may be that illustrated in United States Letters Patent No. 2,397,546, is normally urged in the direction of its arrow by a spring (not shown). This rotation is stopped by engagement of striker pin 117 with pivoted bar 118, and cam face 122 opposes rocking of bar 118.

Hence by suitably shaping cam face 122 I may change the position of striker pin 117 relative to projection 62 and thereby vary the retarding effect of the escapement on shaft 61. Hence face 122 is of changing depth, and when the cam is rotated until pin 121 is engaged with the highest point on cam face 122 (shutter speed $\frac{1}{200}$ second on dial 126) arm 118 and pin 117 are rocked clockwise in Figure 10 to delay and minimize the time of engagement of projection 62 with pin 117. Similarly when the cam is rotated until pin 121 engages the lowest point of cam face 122 ($\frac{1}{10}$ second on dial 126) the shaft projection 62 has its longest time of engagement with pin 117.

The above holds for instantaneous exposures. When it is desired to make a bulb exposure, provision is made for stopping shaft 61 after part of a revolution when plunger 143 is depressed and then permitting shaft 61 to complete its revolution by the operator releasing plunger 143.

A bulb latch 164 is intermediately pivoted on wall 44 at 165. A spring 166 anchored at one end at projection 130' and turned over pivot 165 to terminate in an arm bearing downward on latch 164 provides means by which latch 164 is biased clockwise in Figure 6 to bear at one end on the peripheral surface of cam 128 which is cylindrical except for a flat sector 167. At its opposite end, latch 164 is formed with a lateral hook-like projection 168 which provides a stop face 169.

When instantaneous exposures are desired, the cam 128 is in the position of Figure 6, with lever 164 bearing on the cylindrical surface of the cam and so rocked as to locate projection 168 well below the path of projection 64 on shaft 61. Thus lever 164 has no function when the dial 126 is set for any specific time exposure.

For making a bulb exposure, dial 126 is rotated to dispose the indicia "B" opposite the index dot (Figure 2) and this rotates cam 128 until bulb latch 164 bears on flat 167, being rocked clockwise by spring 166 until projection 168 is located just below the end of stop arm 135 (Figure 19). With the parts in this position, spring 81 may be energized by winding of the film as above explained to rock arm 135 upwardly and to engage shaft projection 65 with stop face 141 on the latch. Bulb latch projection 168 does not interfere with this section, being located below shaft projection 65. Setting of the lever 164 for bulb operation may, of course, be made after the shaft 61 has been cocked, as desired.

When plunger 143 is depressed to make the exposure, latch 139 rocks downwardly as at the beginning of instantaneous exposure operation described above to release projection 65 and start rotation of shaft 61. In this bulb exposure setting, however, as latch 139 rocks downwardly, pin 142 thereon contacts the upper surface of bulb latch 164 to rock the latter counterclockwise until, at about the time that face 141 leaves shaft projection 65, bulb latch projection 168 and face 169 are disposed at the level of shaft projection 64. Engagement of projection 64 with stop face 169 after about 240° rotation of shaft 61 (Figure 21) halts rotation of shaft 61 at the time that head 134 of shutter lever 52 is disposed in dwell groove 132 (Figure 13) of cam 63, at which time the shutter has maximum opening. The shutter now remains open until the operator releases plunger 143, permitting both the shutter release latch 139 and bulb latch 164 to rock upwardly and remove stop face 169 from the path of projection 64 and allow completion of the rotation of shaft 61 through a single revolution, at which time projection 65 engages stop arm 135 as at the terminus of the instantaneous exposure operation.

With reference to Figures 22 and 25, annular formation 66 on the upper end of shaft 61 is formed with a sector of peripheral teeth 171 that project beyond the circular surface 172 which is of less diameter than the periphery of the teeth 171. An inertia wheel 173, which comprises a relatively heavy member of metal or some suitable material, is formed with a central bore 174 by which it is freely journalled on a cylindrical pivot 175 that is parallel to shaft 61 and comprises the intermediate portion of a pin having an enlarged head 176 journalled in a suitable wall boss 177 projecting above pivot 136. The pin has a smaller tip 178 coaxial with head 176 journalled in a suitable integral wall boss 179. The head of the pin is slotted at 181, and the axis of cylindrical portion 175 is eccentric with respect to the common bearing axis of the head and tip portions 176 and 178 whereby, when a tool such as a screw driver is inserted into slot 181 and rotated, the inertia wheel by reason of the eccentricity of its journal at 175 will be shifted toward or away from shaft 61. Figure 26 illustrates the relative eccentricity of the pin and its location relative to the inertia wheel axis, the pin in Figure 22 being 90° displaced for illustration. At the side adjacent shaft 61, the inertia wheel is formed with a cut-out sector 182 which is bridged by parallel pins 183 and 184 disposed at equal angles and equal distances on either side of the common plane of the centers of shaft 61 and journal 175.

Figure 25 illustrates the parts in the position they assume normally prior to start of rotation of shaft 61. As shaft 61 rotates counterclockwise during the above described exposure making operation under the power of spring 81, the teeth 171 successively engage the pins 183 and 184 whereby the teeth 171 impart a succession of short reverse rocking actions to the inertia wheel which oscillates between the full and dotted line position illustrated for the pins 183 and 184 in Figure 25. This rocking movement of inertia wheel 173 is like the pallet in the usual escapement. Inertia wheel 173 thus acts as a check on the initial speed of rotation of shaft 61 so that shaft 61 does not attain an excessive speed of rotation when spring 81 is released. The checking action of the oscillating inertia wheel thus substantially opposes and slows rotation of shaft 61 during the period shaft 61 operates the photoflash lamp control switch described below and during the opening movement of the shutter. By the time that surface 172 of annulus 66 is disposed within sector 182, the shutter is open and no governing effect is exerted on shaft 61 by wheel 173.

The effect of inertia wheel 173 on shaft 61 can be varied by shifting the adjustable eccentric pivot 175, whereby the time of engagement of the inertia wheel with the toothed annulus can be varied.

Bushing 79, as illustrated in Figures 12 and 22, has a cylindrical bore 185 above screw 78, and a short synchronizer shaft 186 of electrically insulating material which is concentric with shaft 61 has its lower end rotatably supported in bore 185. The upper end of shaft 186 is integrally formed as a selector knob 187, from which upstands a finger projection 189 accessible through a suitable aperture 191 at the top of cover 13 (Figure 1), the purpose of projection 189 being for permitting the operator to selectively set the below described switch assembly to cooperate with either fast or slow flash bulbs.

Referring to Figure 24, which illustrates the bottom of the bushing 79, the normally flat surface there illustrated contains imbedded therein two spaced sector-shaped plates of metal 192 and 193 comprising spaced terminals adapted to be wiped across in succession by the brush terminal 190 secured non-rotatably upon the top of shaft 61 as illustrated in Figure 12. Rivets 195 and 194 extend respectively from plates 192 and 193 longitudinally through bushing 79 and provide contact terminals at the upper side of bushing 79. Opposite these contact terminals is a sector-shaped metal terminal strip 196 which is riveted to bushing 79 and connected to contact 194 and is provided with an integral radially outwardly and upstanding spring contact arm 199 for contacting a metal spring blade 201 depending from the central terminal of the flash lamp adaptor socket 202 as in Figure 22. Contact 193 is thus always in circuit with the center terminal of socket 202. When top 13 is mounted on the camera body arm 201 is tightly engaged with arm 199 in electrical contact.

Non-rotatably secured to shaft 186 is a metal contact member 203. The position of member 203 is selected by the operator turning selector knob 187. When the contact 203 is in the position illustrated by phantom lines in Figure 23, which corresponds to the "F" position of Figure 1, terminal 193 of Figure 24 is in circuit with the flash bulb socket 202. When contact 203 is in the 90° displaced "M" position permitted by opening 191, terminal 192 also will be connected in the flash light socket circuit.

Shaft 61 is preferably flashed with copper externally to make it a good electrical conductor. A wire 204 (Figures 7 and 22) is connected at one end to outer shell 205 of socket 202 and at the other end to a clip 206 carrying a spring arm 207 bearing on shaft 61.

In operation, as shaft 61 rotates under the impulse of spring 81, the brush 190 which is moving in the direction of the arrow in Figure 24 first contacts segment 192, but if the selector switch contact 203 is in the position of Figure 23, which is the case when a small size bulb is in the flash lamp socket, the flash lamp circuit is not yet closed to energize the bulb, and energization of the bulb is delayed until brush 190 contacts segment 193. The relative angular positions of brush 190 and segment 193 with respect to the shutter operating faces of cam 63 are such that by the time the head 134 of the shutter operating lever reaches the dwell period 132, whereby the shutter is wide open, the small lamp connected to the socket will have attained maximum energization and illumination. This is the setting for fast flash bulbs and the letter F on the top of knob 187 will appear visible through opening 191 of Figure 1 in this setting.

If the contact 203 is in the 90° displaced position from Figure 23, the flash lamp circuit will be completed as soon as brush 190 crosses segment 192. This position corresponds to the use of the larger type bulb which requires more time to get up to full illumination than does the smaller bulb. This is the "M" setting of Figure 1, the angle of difference between segments 192 and 193 representing the difference in the time that it takes for the two bulbs to reach full illumination as correlated with the speed of rotation of shaft 61, in cooperation with inertia wheel 173.

There is thus provided a novel camera wherein the power shaft, after being energized, is released and power driven to efficiently operate the shutter during opening and closing movements with substantially uniform speed of rotation, and in synchronism therewith to operate a photoflash lamp circuit which may be adjusted for timing the shutter exposure with either the large bulbs which require considerable time to reach full illumination and smaller bulbs which reach full illumination in a much shorter time, and thereby correlate full illumination period of either of these bulbs with the maximum shutter opening.

The inertia wheel 173 controls rotation of the shaft 61. During the time that toothed sector 171 is passing through the inertia wheel, brush 190 is traversing contact segment 192. The slowed controlled action of the shaft during this period also prevents shutter rebound action as above explained so that the shutter is peculiarly efficient for short exposures.

Once this mechanism has been set, all in predetermined angular relation with respect to shaft 61, there is no further adjustment required as to shaft 61. All adjustments for controlling any of the factors of operation of the camera are separate from power shaft 61, which performs the same sequence of operation regardless of the various adjustments for shutter speed and regardless of which position the bulb selector switch is disposed.

Figures 27–29 relate to a further embodiment of the invention wherein the film wind mechanism is directly drive connected to the sprocket whereby the power shaft is rotated to energize power spring 81 without using the film as a force transmitting member as in the earlier described embodiment.

Figure 27 illustrates the parts substantially looking from the back of the camera in the direction of Figure 4. Sprocket shaft 91 is formed with a reduced extension 210 on which sprocket wheel 92 is non-rotatably fitted and in which is formed a central bore 211 provided with diametrically opposite longitudinal grooves 212.

A depending boss 213 integral with flange 45 has a central cylindrical bore for rotatably mounting a drive collar 214. A pin 215 non-rotatably mounted in collar 214 projects downwardly therefrom into bore 211 and pin 215 is formed with integral radial key projections 216 that fit with grooves 212 to provide a non-rotatable connection between collar 214 and sprocket 90. Spring 105 reacts between a loose washer 217 and sprocket 90 to urge the latter into an axially constant position.

Above flange 45, collar 214 is formed with an enlarged shoulder 218 upon which is non-rotatably mounted, as by a press fit, a gear 219. Shoulder 218 serves also as a step or thrust bearing for collar 214. Above shoulder 218, collar 214 is formed with a further enlarged head 220 which has an upwardly open bearing recess 221 for rotatably mounting the lower end of a counter drive sleeve 222.

Sleeve 222 has non-rotatably mounted thereon, as by press fitting, a gear 223. At its upper end, sleeve 222 is surrounded by the depending skirt 224 of a counter dial 225 that extends through a suitable aperture in cover 13, and sleeve 222 is secured to dial 225 as by a screw 226 threaded into the bore of sleeve 222. A coiled compression spring 227 maintains this connection normally axially tight and provides a friction slip clutch between dial 225 and sleeve 222 for resetting dial 225 by rotating it with respect to sleeve 222. An annular spacer 228 is provided between cover 13 and the top of gear 223 and a bracket 229 such as that illustrated in Figure 5 may be used to support the counter assembly when cover 13 is removed.

Gears 219 and 223 are constantly meshed with a relatively wide idler gear 231 freely journalled on a pin 232 upright on the flange 45. Since gear 223 has one more tooth than gear 219, each revolution of sprocket 90 will rotate gear 223 and dial 225 an increment greater than a single rotation and the scale on dial 225 is graduated to indicate these increments. This is generally conventional counter drive construction and the details thereof per se do not comprise part of the present invention.

Adjacent and parallel to sprocket 90, the take-up film spool comprises a cylindrical shaft 233 having a flat side surface 234 and formed at opposite ends with central pivot pin extensions 235. Annular end members 236 and 237 are non-rotatably mounted on shaft 233, and the lower pivot pin 235 is journalled in a block 238 secured in the end of chamber 34 (Figure 4). A rod 239 extends parallel to surface 234 between end members 236 and 237 for gripping the leader end of the film to be wound.

The upper pivot pin 235 is journalled in the cylindrical lower bore 241 of a clutch member 242 having at its lower end an enlarged shallow cup 243 lined with an annular ring 244 of cork or like high friction facing material constituting a friction clutch connection between clutch member 242 and spool shaft 233.

Clutch member 242 projects through a suitable aperture in the upper body wall 245 and is journalled within a suitable upstanding bushing 246 rigidly secured on wall 245. At its upper end clutch member 242 is formed with a diametral slot 247 (Figure 31) within which is disposed the non-circular lower end 248 of the wind gear unit 249 illustrated in Figure 28.

Above clutch member 242, wind gear unit 249 is integrally formed with a gear 251, an enlarged cylindrical bearing formation 252, an annular groove 253 and a non-circular head 254. A plate 255, rigid with bushing 246 as will be described, carries a depending rigid pivot pin 256 on which is freely rotatably mounted an idler gear 257 constantly meshed with both gear 231 and gear 251. Plate 255 is formed with a central bore 258 surrounding cylindrical formation 252 and providing a radial bearing support for wind gear unit 249.

In the camera assembly, the bottom of cover 13 rests on plate 255, and a clutch block 259 (Figure 29) having a diametral slot 261 in its upper end is secured rigidly to bushing 246. Clutch block 259 surrounds the upper portion of unit 249 projecting through top cover 13. Preferably block 259 is formed with two apertures 262 through which extend screws 263 that pass through suitable apertures in top cover 13 and plate 255 and are threaded into bushing 246. Thus clutch block 259, plate 255 and bushing 246 are rigidly secured together when screws 263 are tightened. The section illustrated in Figure 27 may be considered as corresponding to line A—A in Figure 29.

A coiled compression spring 264 extends between the shoulder provided by formation 252 and an internal spring seat 265 in clutch block 259. The lower end of spring 264 is of smaller diameter than the remainder of the spring, being disposed in groove 253 so that when the wind gear unit is removed from the assembly the spring 264 remains with it.

An externally knurled wind knob 266 having a cylindrical internal surface 267 and a lower inturned end flange 268 is rigidly secured to the upper end of wind gear unit 249 as by an aperture 269 fitted non-rotatably on head 254 and a screw 271 threaded into the upper end of unit 249. A coil spring 272 is disposed within knob 266 with its lower end inturned at 273 within slot 261 to anchor the spring to the clutch block.

Spring 272 provides for unidirectional rotation of knob 266. When knob 266 is rotated clockwise to wind film on the spool in chamber 34 such is permitted by spring 272 which contracts in diameter. When an attempt is made to oppositely rotate knob 266, however, with the parts as in Figure 27, friction between spring 272 and brake surface 267 locks knob 266 against rotation.

In operation, with the film in the camera with its leader end between rod 239 and spool shaft 233, the film is wound on shaft 233 by the operator winding knob 266 in the direction of the arrow on it. This positively rotates clutch member 242 which drives spool shaft 233 through the friction clutch at 244. At the same time gear 251, through gears 257, 231 and 219, positively drives the sprocket 90 to advance the film toward the spool in chamber 34. Since rotation of the sprocket winds power spring 81 as above described, I have thus provided in this embodiment of the invention a positive mechanical winding arrangement for cocking the power shaft assembly when the film is wound.

The relative sizes of gears 251, 257, 231 and 219 are such that rotation of the knob 266 is faster than rotation of sprocket 90 so that the film is overdriven at the spool, and the difference in these drive speeds maintains the film taut between the sprocket and take-up spool with the clutch face 244 slipping to prevent excessive tension and breaking of the film. As the diameter of the film on shaft 233 accumulates, the linear speed of the film at the spool increases with respect to the sprocket but the slip clutch at 244 maintains the film tension even, and there is no need for complicated roll diameter compensation devices hitherto considered necessary in some cameras.

For rewinding the film when the exposures are complete knob 266 is pulled out until spring end 273 clears slot 261 and slightly rotated so that spring end 273 engages the upper end of clutch block 259. This disconnects knob 266 and thereby permits reverse idle rotation of the take-up spool under pull of the film.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera, film advancing mechanism, a power unit energized by operation of said film advancing mechanism comprising a spring having at one end a control connection and at the other end a winding connection, exposure control mechanism operatively connected to said control connection, stop means for maintaining said power unit inoperable to actuate said exposure control mechanism during said energization including a pivoted release latch adapted to engage said control connection, means for arresting movement of the film after a predetermined length has been advanced through the camera, reset means distinct from said release latch operated during energization of said power unit operable upon said stop means to place said power unit under control of said release latch when said film has been advanced said predetermined amount, and manually operable means for actuating said release latch.

2. In the camera defined in claim 1, said means for arresting movement of the film comprising cooperating means on said winding connection and reset means.

3. In a camera, a shutter, a shutter actuating member, a support on a wall of said camera, a rotatable shaft having its opposite ends rotatably mounted on said support and an opposite wall of said camera, a cam on said shaft operatively engaged with said member for positively effecting opening and closing movements of said shutter during rotation of said shaft, a reset cam rotatable on said support, power means comprising a spring anchored at opposite ends to said reset cam and said shaft, means controlling said power means for selectively effecting rotation of said shaft by said power means when an exposure is desired comprising a pivoted release latch and stop means associated with said power means, and reset mechanism interconnecting said reset cam and said stop means.

4. In a camera, a power unit energized during film advance, a shaft, exposure control mechanism operably connected to said shaft, a shiftable stop member coacting with a part on said shaft for holding said shaft against rotation by said power unit prior to and during said film advance, reset means shiftable during said film advance for removing said stop member, a release latch pivoted in said camera and having a stop for holding said shaft against exposure making rotation after removal of said stop member, manual means for operating said release latch to remove its stop and permit exposure making rotation of said shaft, and means operable during said shaft rotation for positively moving said stop means into the path of said part on said shaft to arrest rotation of said shaft after a single revolution.

5. In a camera, a power shaft having a projection, exposure control mechanism operably connected to said shaft, spring means for rotating said shaft to make an exposure, a member rotatable for winding said spring means, a shiftable stop for engaging said projection for holding said shaft against rotation during winding of said spring means, a pivoted release latch distinct from said stop and having a stop face, reset means shifted by rotation of said member for removing said stop from engagement with said projection, said projection then being engaged by said stop face after insignificant rotation of the shaft by the spring means to prevent exposure making rotation of said shaft, means for manually operating said release latch to disengage said stop face and said projection to permit exposure making rotation of said shaft by said spring means, and means for moving said shiftable stop back into the path of rotation of said projection to limit rotation of said shaft to a single revolution.

6. In the camera defined in claim 5, said reset means comprising a cam on said rotatable member, and a shiftable member operably connected at opposite ends to said cam and said shiftable stop.

7. In the camera defined in claim 5, a film engaging sprocket in said camera, and mechanism connecting said sprocket and rotatable member for rotating said member to wind the spring means only when the film is being moved in a predetermined direction.

8. In a camera, film advancing means, a power shaft, a shutter operably connected to said shaft, a rotatable member, means for arresting rotation of said rotatable member after a predetermined length of film has been advanced in the camera, means for preventing rotation of said member in one direction, a power spring connected at opposite ends to said shaft and said member, means for arresting rotation of said shaft during rotation of said member to wind said spring comprising a projection on said shaft and a pivoted stop, reset mechanism connected between said rotatable member and said stop for disengaging said stop from the projection during said rotation of said member, a release latch distinct from said reset mechanism and having a stop face in the path of said projection immediately following removal of said stop, manual means for operating said release latch to disengage said stop face and projection and permit exposure making rotation of said shaft, and means operable during said shaft rotation for moving said stop back into the path of said projection to limit shaft rotation to a single revolution and for disabling said means preventing rotation of said rotatable member so that the camera is ready for a fresh film advancing operation.

9. In the camera defined in claim 8, a second projection on the shaft, a bulb latch shiftable between operative and inoperative positions, and cooperating means on the release latch and bulb latch adapted, during shaft release operation thereof, to move said bulb latch from its operative position into the path of said second projection whereby said shaft rotation is stopped after only a part of a revolution with the shutter open, and means for disengaging said second projection and the bulb latch when the operator terminates said operation.

10. In a camera, a shutter, a rotatable shaft operably connected to actuate said shutter, a coiled power spring connected at one end to said shaft, a rotatable member connected to the other end of said spring, a cam on said member, a pivoted release latch, means resiliently biasing said latch in one direction, a projection on said shaft adapted to be engaged by said latch for holding the shaft against rotation when the spring is energized by rotation of said rotatable member, a shiftable stop in the path of rotation of said projection in advance of said latch for holding said shaft against rotation while the spring is being wound, a reset bar shiftably mounted in said camera separately from said latch and operatively connected to said cam so as to be shifted thereby during rotation of said member, an operative connection between the said latch and said shiftable stop for removing said stop from the path of said projection when the spring has been energized, said projection after removal of said stop engaging said release latch which holds said shaft against rotation by the power spring, and means for moving said latch in opposition to said resilient means out of the path of said projection to permit rotation of said shaft under the power of said spring.

11. In the camera defined in claim 10, means for restoring said stop into the path of said projection after said latch has been tripped and the shaft has started to rotate so as to limit rotation of said shaft to a single revolution.

12. In the camera defined in claim 10, said stop being maintained inoperative by said projection after the stop has been removed from the path of said projection and until said shaft has rotated a small amount.

13. In a camera, a power driven shaft, axially and circumferentially spaced radial projections on said shaft, a bulb latch, a release latch engaged with one of said projections, means for moving said release latch to disengage it from said one projection, means operatively connecting the said latches so that said movement of the release latch moves said bulb latch into the path of said other projection so as to arrest said shaft after part of a revolution, means for restoring both latches to permit the shaft to complete a single revolution, and means rendering said connection between said latches inoperable.

14. In a camera, a shutter, a coiled power spring, a shutter drive mechanism between one end of said spring and the shutter, a rotatable member coupled to the other end of said spring, a rotatable film winding member, a train of gears constantly drive connecting said film winding member and said rotatable member and means preventing rotation of said rotatable member except when said film winding member is turned in a selected direction.

15. In a camera, a shutter having an operating lever, a cam having a circumferential slot adapted to receive an end of said lever, a power spring connected to rotate said cam, means controlling rotation of said cam by said spring, said cam slot comprising a long portion extending substantially perpendicular to the axis of its rotation and a short shutter opening and closing portion between the ends of said long portion, said short shutter opening and closing portion comprising in succession an inclined surface on one side of the slot adapted to engage and move the end of said lever in a direction longitudinally of the axis of the cam for shutter opening movement, a short portion parallel to the long portion providing a shutter open period, and an inclined surface on the other side of the slot adapted to engage and move the end of the lever in the opposite direction longitudinally of said cam axis for shutter closing movement, and said cam slot being relieved at its surface opposite said first-named inclined surface to permit free rebound of said shutter lever end and consequent swifter shutter opening movement.

16. In the camera defined in claim 15, a governor operably connected to said shutter drive mechanism for controlling the speed of rotation of said cam during the shutter opening movement thereof.

17. In a camera, a rotatable shutter control member, a torsion spring anchored at one end to said control member, a spring winding member rotatable in the direction for winding said spring and means for preventing its rotation in the other direction, said spring being anchored at its other end to said winding member, film winding mechanism, a motion transmitting connection between said film winding mechanism and said spring winding member, releasable means for holding said shutter control member against rotation during winding of said spring, a reciprocable reset member shifted by rotation of said spring winding member into stop engagement with said spring winding member to arrest rotation of said spring winding member after predetermined linear advance of said film, and means for substantially simultaneously tripping said releasable means for making an exposure and shifting said reset member out of the effective path of rotation of said spring winding member to permit subsequent advance of the film.

18. In a camera having a film take-up spool, a power shaft, a shutter, actuating mechanism between said shaft and shutter, a power spring for rotating said shaft, means for winding said spring comprising a member rotated during winding of the film on said spool, and a motion transmitting connection between said member and said spring comprising a gear on said member, a rotatable gear connected to said spring, a third gear adapted to mesh with both of said gears, and a pivoted support for said third gear mounted for rocking movement about the axis of rotation of said member whereby rotation of said member in one direction urges said third gear into mesh with said spring connected gear and opposite rotation of said member tends to demesh said third and spring connected gears.

19. In a camera, a spring driven power shaft, a shutter operably connected thereto, axially and circumferentially spaced radial projections on said shaft, a pivoted bulb latch, a pivoted release latch engaged with one of said projections when the spring is wound, means for moving said release latch in one direction to disengage it from said one projection, means for operatively connecting said latches at least during said movement of the release latch in said one direction for moving said bulb latch into the path of the other of said projections so as to arrest said shaft after part of a revolution, and means operable when said release latch moves in the opposite direction for removing said bulb latch from engagement with said other of said projections to permit said shaft to complete a single revolution.

20. In a camera, film advancing means, a power spring, a shutter having an operative motion transmitting connection to said spring, a release latch for said connection, means operatively connected to said film advancing means for winding said spring, means associated with said winding means for arresting said film advancing means after a predetermined length of film has been advanced, and means operably connected to said winding means for effecting operative engagement between said release latch and said motion transmitting means upon winding of said spring.

21. In a camera having a body, film advancing mechanism, shutter mechanism within said body, a pivoted operating lever for said shutter mechanism, an actuator operably connected to said lever and rotatably mounted within said camera body, a torsion spring having one end anchored to said actuator, a spring winding member rotatably mounted in said camera, said torsion spring having its other end anchored to said spring winding member, means interconnecting said film advancing mechanism and said spring winding member for rotating said spring winding member to wind the spring, means operated by and coacting with said spring winding member for arresting said film advancing mechanism after advance of a predetermined length of the film, and means coacting with said actuator for preventing operation of said shutter mechanism after an exposure has been made until said film has been advanced said predetermined length.

22. In a camera, a shutter, a power spring, exposure control mechanism operatively interconnecting said spring and shutter comprising a shaft rotatable in a predetermined direction by said spring to make an exposure, a cam actuated by said shaft, a shutter lever adapted to be engaged and positively driven by said cam, an escapement assembly adapted to be operatively connected to control rotation of said shaft and being adjustable for selecting predetermined exposure periods, and an inertia wheel distinct from said escapement assembly having a segmental gear connection with said shaft operative to check rotation of said shaft only during an initial part of said exposure making rotation of said shaft by said spring and before operative connection of the shaft to the escapement assembly for minimizing rebound of said shutter lever when it is being moved by said cam to open the shutter.

23. In a camera, a film winding mechanism, a shutter, a rotatable shaft, a power spring connected at one end to said shaft, a rotatable member connected to the other end of said spring geared to the film winding mechanism for winding said spring during the film winding operation, a reciprocable member shifted by said rotatable member into stop engagement with said rotatable member after a predetermined advance of the film for arresting rotation of said rotatable member and thereby preventing further actuation of said film winding mechanism to advance the film, means holding said shaft against rotation while the spring is wound, means substantially simultaneously releasing said shaft for rotation by said spring and shifting said reciprocable member out of said stop engagement with said rotatable member, and means interconnecting said shaft and shutter for actuating said shutter during predetermined rotation of said shaft.

24. In a camera, film advancing means, a power spring, shutter drive mechanism, a release latch having a control position where it operatively engages said mechanism to prevent actuation of the shutter, means driven by said film advancing means for winding the spring, means associated with said spring winding means for arresting the film advancing means after a predetermined length of film has been advanced, and means operatively connected to said spring winding means for setting said release latch into said control position.

JAMES E. HARVEY.

References Cited in the file of this patent

UNITED STATES PATENTS

| Number | Name | Date |
| --- | --- | --- |
| 2,036,326 | Frost | Apr. 7, 1936 |
| 2,140,445 | Mihalyi | Dec. 13, 1938 |
| 2,150,696 | Nelson | Mar. 14, 1939 |
| 2,227,240 | Becker et al. | Dec. 31, 1940 |
| 2,233,345 | Hineline | Feb. 25, 1941 |
| 2,298,787 | Fassin | Oct. 13, 1942 |
| 2,304,035 | Steiner | Dec. 1, 1942 |
| 2,307,748 | Philips | Jan. 12, 1943 |
| 2,364,466 | Nagel | Dec. 5, 1944 |
| 2,371,072 | Simmon et al. | Mar. 6, 1945 |
| 2,406,691 | Jacobson et al. | Aug. 27, 1946 |

FOREIGN PATENTS

| Number | Country | Date |
| --- | --- | --- |
| 246,011 | Switzerland | Aug. 16, 1947 |